(12) United States Patent
Suzuki et al.

(10) Patent No.: US 7,860,824 B2
(45) Date of Patent: Dec. 28, 2010

(54) SYSTEM AND METHOD OF DISASTER RECOVERY

(75) Inventors: Yoshio Suzuki, Kokubunji (JP); Nobuo Kawamura, Atsugi (JP); Shinji Fujiwara, Sagamihara (JP); Satoru Watanabe, Fuchu (JP); Kazuhiko Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 11/802,186

(22) Filed: May 21, 2007

(65) Prior Publication Data

US 2008/0229140 A1   Sep. 18, 2008

(30) Foreign Application Priority Data

Mar. 15, 2007   (JP) .............................. 2007-066429

(51) Int. Cl.
  *G06F 7/00*   (2006.01)
(52) U.S. Cl. ..................... 707/609; 707/610; 707/640; 707/661
(58) Field of Classification Search ........................ None
  See application file for complete search history.

(56) References Cited

U.S. PATENT DOCUMENTS

| | | | | |
|---|---|---|---|---|
| 5,412,801 A | * | 5/1995 | de Remer et al. ............. 714/20 |
| 6,067,550 A | * | 5/2000 | Lomet ......................... 707/202 |
| 6,226,651 B1 | * | 5/2001 | Masuda et al. ............... 707/202 |
| 2003/0074600 A1 | * | 4/2003 | Tamatsu ........................ 714/6 |
| 2003/0126133 A1 | * | 7/2003 | Dattatri et al. ................ 707/10 |
| 2003/0200480 A1 | * | 10/2003 | Beattie ......................... 714/13 |
| 2003/0220935 A1 | * | 11/2003 | Vivian et al. ................ 707/102 |
| 2005/0273474 A1 | | 12/2005 | Kawamura et al. |
| 2005/0283504 A1 | * | 12/2005 | Suzuki et al. ................ 707/202 |
| 2006/0004877 A1 | | 1/2006 | Ishikawa et al. |
| 2006/0026452 A1 | * | 2/2006 | Suzuki et al. .................... 714/2 |
| 2007/0198593 A1 | * | 8/2007 | Prahlad et al. .............. 707/200 |
| 2007/0220059 A1 | * | 9/2007 | Lu et al. ....................... 707/200 |
| 2007/0271302 A1 | * | 11/2007 | Atkins et al. ................ 707/200 |
| 2008/0114815 A1 | * | 5/2008 | Sutoh et al. ................. 707/200 |

FOREIGN PATENT DOCUMENTS

JP   2004-282346 A   *   3/2004

OTHER PUBLICATIONS

"Oracle Data Guard", Oracle Technology Network, http://www.oracle.com/technology/deploy/availability/htdocs/DataGuardOverview.html, p. 2-6.

* cited by examiner

*Primary Examiner*—Charles Kim
*Assistant Examiner*—Jessica N Le
(74) *Attorney, Agent, or Firm*—Stites & Harbison, PLLC; Juan Carlos A. Marquez, Esq

(57) ABSTRACT

In a DR system, from the viewpoint of device cost, when search is not carried out, a physical application where log recovery is available by inexpensive DB appliance server is adopted. Further, a local mirror operation at a secondary site is not carried out. Furthermore, from the viewpoint of operation, by a log apply function unit, the tendencies of a log application and operations are monitored, and a search process is accepted according to the progress conditions of the log application. When the log application does not catch up sufficiently, the search is not accepted. Moreover, when a consistency guarantee of a secondary DB is made, not transactions in process at the moment of search instruction are undone (rolled back), but only transactions in process at the moment of a search instruction are redone (rolled forward).

18 Claims, 15 Drawing Sheets

CONVENTIONAL SYSTEM

THE PRESENT SYSTEM

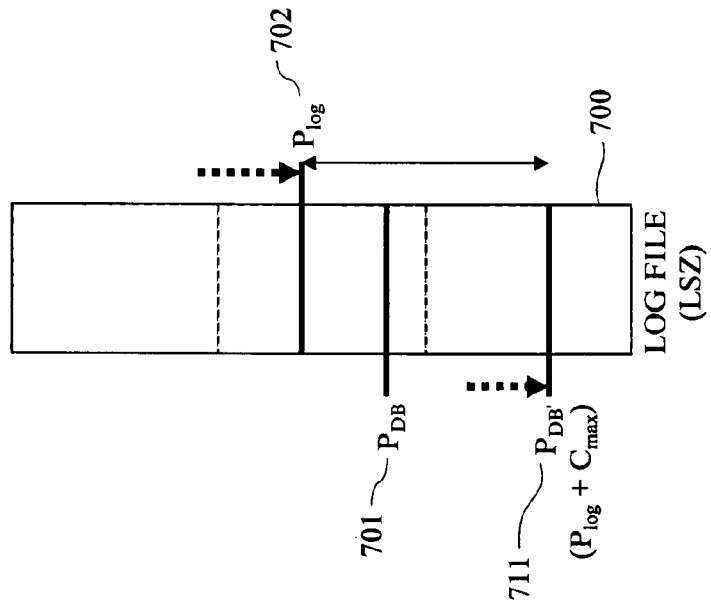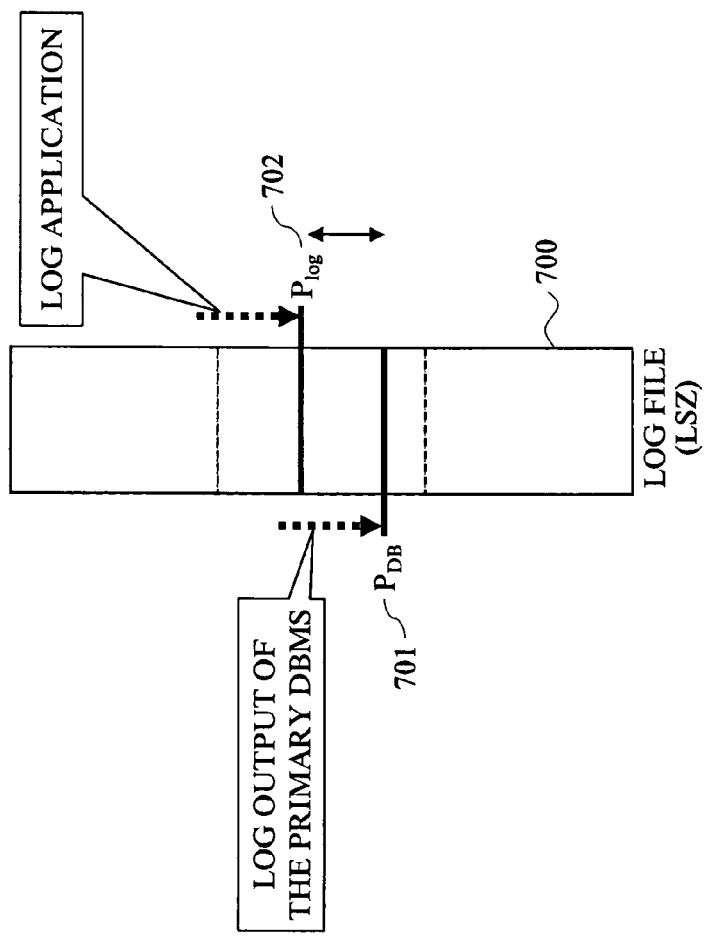

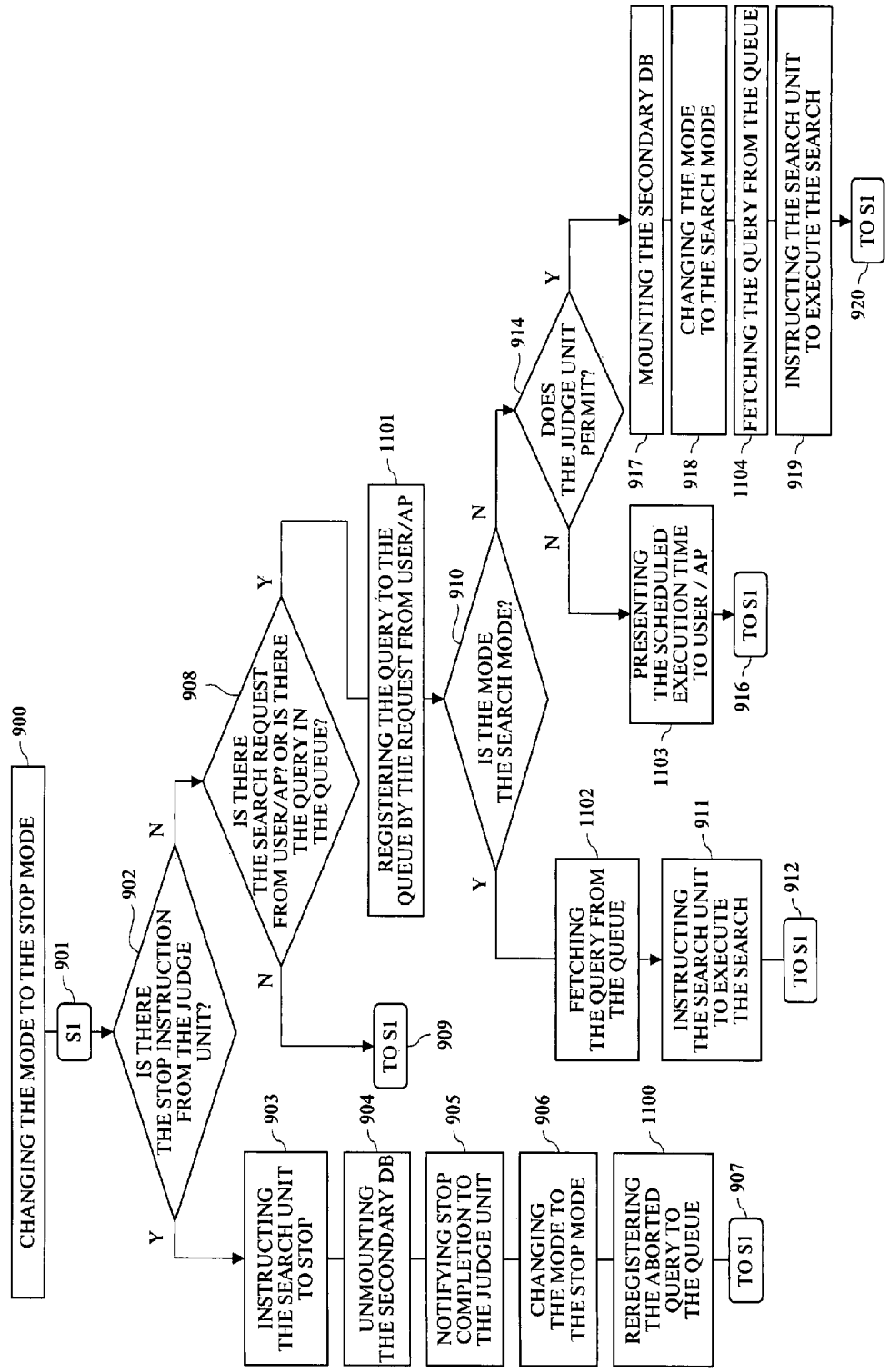

FIG. 9A

Query 1200

| # | SQL | REGISTRATION TIME | EXECUTION TIME (PREDICTED) | EXECUTION TIME | DB TIME | EXECUTION RESULT |
|---|---|---|---|---|---|---|
| 1 | Select * from Order where ... 1201 | 10:59:00 1202 | 11:00:00 1203 | 11:00:02 1204 | 10:59:30 1205 | result 1206 |
| ... | ... | ... | ... | ... | ... | ... |
| 5 | Select * from Customer where ... 1207 | 11:03:30 1208 | 11:05:00 1209 | — 1210 | — 1211 | — 1212 |

FIG. 9B

Result 1220

| EXECUTION RESULT OF THE QUERY(Select * from Order where ...) | | | |
|---|---|---|---|
| Id | Name | ... | ADDRESS |
| 1 | A | ... | Aaa |
| ... | ... | ... | ... |
| 10 | B | ... | bbb |

AT CHECK POINT ACQUISITION REQUEST

AT CHECK POINT COMPLETION

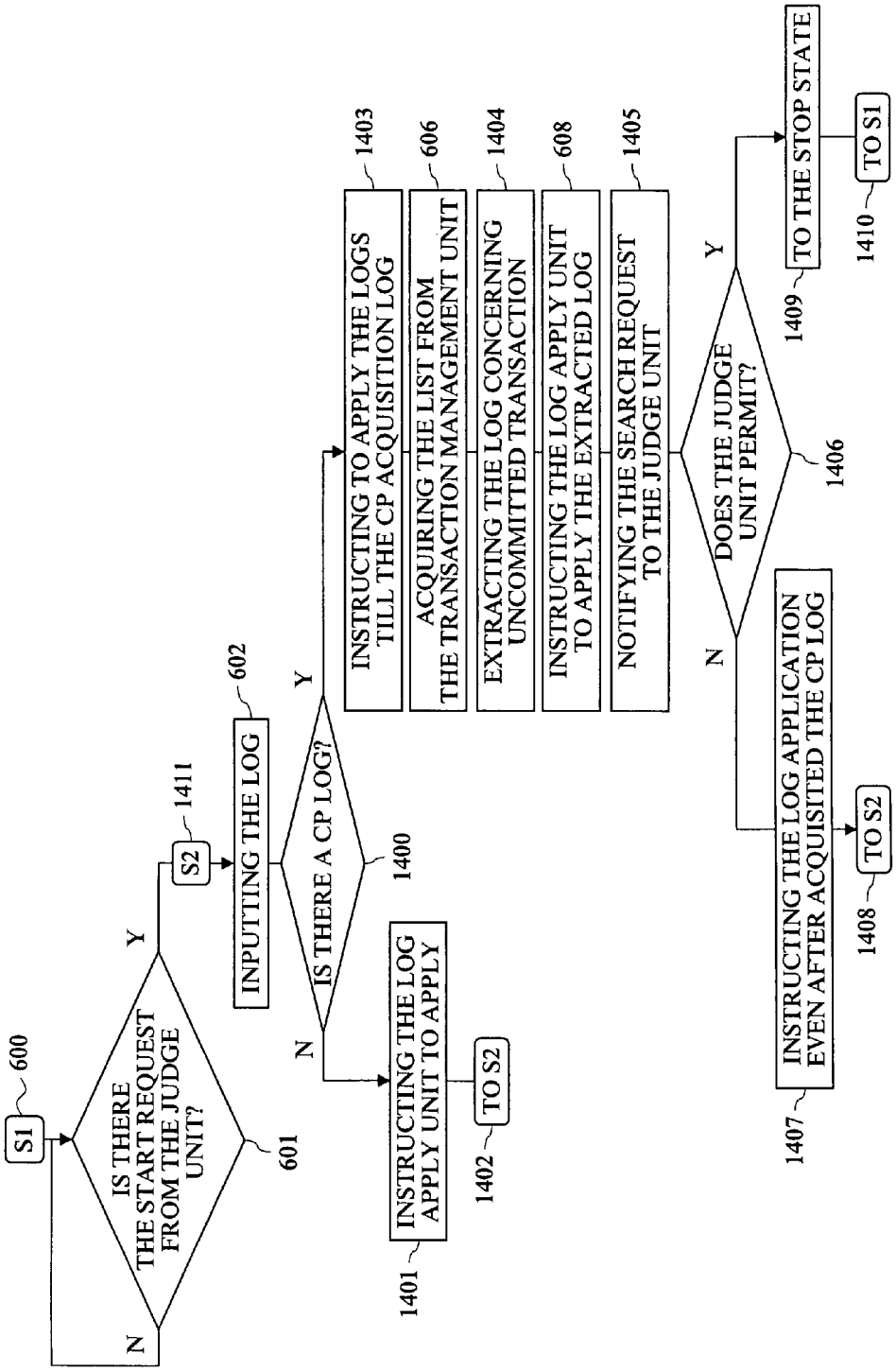

LOGICAL APPLICATION

PHYSICAL APPLICATION
+
LOCAL MIRROR OPERATION

CONSISTENCY GUARANTEE PROCESS FOR SEARCH EXECUTION (AT START)

CONSISTENCY GUARANTEE PROCESS FOR SEARCH EXECUTION (AT END)

RESTART OF LOG APPLICATION

SYSTEM AND METHOD OF DISASTER RECOVERY

CROSS-REFERENCE TO RELATED APPLICATION

The present application claims priority from Japanese Patent Application No. JP 2007-066429 filed on Mar. 15, 2007, the content of which is hereby incorporated by reference into this application.

TECHNICAL FIELD OF THE INVENTION

The present invention relates to a Disaster Recovery (DR) technology, more specifically, to a technology effective when applied to a log apply function and a search function of a secondary site.

BACKGROUND OF THE INVENTION

According to a study by the inventors of the present invention, the following technique with respect to the DR technology is considered. DR is a remote backup system which duplicates information updated in a primary site to a secondary site located in a remote place. As the DR method, there is known a method using a remote copy function of storage. In this method, data written into a storage in the primary site is duplicated to a secondary storage by the remote copy function without using server resources. In the case of a DR system between cities on the assumption of wide area disasters such as an earthquake and the like, it is necessary to connect a primary storage to a secondary storage that is located at a remote place therefrom several hundred kilometers away via a WAN.

In a computer at the primary site, a Database Management System (DBMS) operates. The DBMS refers to or updates data stored in a DB in the storage according to an inquiry from a user Application (AP) on a client. Herein, in the DBMS, in order to realize its performance improvement, updating is carried out on a buffer on a memory, and writing to the storage is carried out at other timing. However, for reliability improvement, with regard to a log as an update difference, writing is made in sync to a log VOL of the storage at the timing of commitment.

In a DR system where sites are several hundred kilometers away from each other, the costs to configure and maintain its line unit (network unit) become high. Especially, in order to maintain a wide-bandwidth line of several hundred kilometers, extremely large costs are required, and in order to reduce the costs, it is necessary to realize the DR by a narrow-bandwidth line. Therefore, there is known a log-based DR method where only logs of the DBMS are transferred, and with regard to a DB main body, duplication is made by applying the logs to the secondary site. In the log-based DR method, in the computer at the secondary site, a log apply unit that reads logs transferred by the remote copy, and applies the read logs to the DB.

SUMMARY OF THE INVENTION

Meanwhile, with respect to the DR system as mentioned above, the study by the inventors of the present invention have revealed the following. In the DR system, to prepare against future disasters, device operating costs of the second site must be shouldered even in normal operations. Therefore, in order to improve the Return of Investment (ROI), there is a demand that resources of the secondary site should not be used exclusively for backup, but should be used effectively even in normal operation. As an effective usage, for example, the secondary DB may be used for search and analysis operations. Or, by making the reference of the secondary DB available, responding to operation mistakes at the primary site (recovering data deleted by mistake at the primary site from the secondary site) may be considered.

As log apply methods to be carried out at the secondary site, physical application and logical application are known. The physical application is a method used for a normal crash recovery, in which read logs are applied as they are. On the other hand, in the logical application, read logs are converted into SQL, and the SQL is executed and thereby the DB is recovered. Hereinafter, with reference to FIG. 14 and FIG. 15, methods of log application and their problems are explained. FIG. 14A shows a conventional system 1 (logical application+local mirror operation), and FIG. 14B shows a conventional system 2 (logical application). FIG. 15A and FIG. 15B show a consistency guarantee process (at start and at end, respectively) of the secondary DB for research execution, and FIG. 15C shows the process at restart of log application.

(1) Conventional System 1 and its Problems

In the conventional system 1 shown in FIG. 14A, the DB is recovered by the physical application, and in the secondary storage, the local mirror operation is carried out. That is, while the log application is carried out, a secondary DB 123 and a secondary DB' 201 are made into a sync state, and only when a search is carried out, the secondary DB 123 (secondary DB' 201) is made into a state where transaction (Tr) consistency can be attained, and then they are disconnected. When the search is carried out, since a search function unit 200 uses the secondary DB' 201, a log apply function unit 141 that uses the secondary DB 123 can continue the process without stopping.

A process method at the time when the secondary DB 123 (secondary DB' 201) is made into the consistent state is explained with reference to FIG. 15. When there is an instruction to make it into the consistent state in the state of FIG. 15A (when there is a request for a search execution), first, a suspend process (undo) is carried out on logs concerning Tr 303, 304 now in process, and thereby the state of FIG. 15B must be made. The state after undo execution is indicated by Tr (313, 314). Since this undo process itself is regarded as an update to the secondary DB, a log is created separately and recorded. This process is not carried out in the primary site, and is an original process of the secondary site. Further, as shown in FIG. 15C, in order to stop the search process and restart the log application, the undo process must be done again, therefore, the processes and operations become complicated. That is, it is necessary to redo the processes not from the start time point t1 (306) of the consistency guarantee process, but from the start time point t0 (305) of the oldest Tr 304 among Tr 303 and Tr 304 in process. Further, in the conventional system 1, since the local mirror operation is required at the search execution, the processes and operations become complicated. Furthermore, twice the capacity of the secondary storage is required, and accordingly the device cost increases, which is another problem.

(2) Conventional System 2 and its Problems

In the conventional system 2 shown in FIG. 14B, the secondary DB 123 is recovered by the logical application. When the logical application is used, since SQL is issued in both log recovery and search, these can be executed simultaneously and parallely. However, in the logical application, since SQL conversion and issue cost are added, the application speed is inferior to the physical application, further, CPU load becomes high. Therefore, even in the case where search is not always carried out, expensive hardware (secondary DB server/search server) of high processing performances must be arranged. Moreover, since the log application speed is also inferior to the physical application, a possibility that a log not yet applied in the secondary site may be overwritten (wrapped around) by a log output in the primary site becomes high. At the occurrence of wrap-around, it is necessary to perform new operations such as transfer and apply of an archive log, and accordingly, there is a possibility that there may occur a problem in the operation at the primary site.

According to the above, in the conventional systems 1, 2, there are the following problems.

(1) Device Costs (1-1) In the logical application, the CPU load becomes higher than in the physical application, even when the search is not carried out. It is thus necessary to prepare an expensive server of high processing speed for log recovery. (1-2) In the case when the local mirror operation is carried out by the physical application, it is necessary to prepare a drive with twice capacity in the secondary storage, and accordingly, the device cost increases.

(2) Operation Costs (2-1) In the logical application, since the application speed is slow, a possibility that a log not yet applied in the secondary site may be wrapped around becomes high. (2-2) In order to carry out the search in the secondary site, it is necessary to let the secondary DB to the state where Tr consistency is attained. In order to attain the state with Tr consistency, uncommitted Tr is undone (rolled back). Also to an update caused by this undo, it is necessary to record the update log. Further, to end the search and restart the log application, it is necessary to redo the processes from not the time point when the log application is stopped but the time point when the oldest Tr among the uncommitted Tr is issued, and accordingly, the process becomes complicated.

Accordingly, an object of the present invention is to provide a DR technology that can solve the above problems, and reduce the device costs and make the operation easy.

The above and other objects and novel characteristics of the present invention will be apparent from the description of this specification and the accompanying drawings.

The typical ones of the inventions disclosed in this application will be briefly described as follows.

In the present invention, in order to achieve the above objects, the DR technology is realized by the following policies.

(1) Device Cost Reduction (1-1) In order to reduce the server costs, when the search is riot carried out, the physical application where a log recovery is available by an inexpensive appliance server is adopted. (1-2) In order to reduce the storage costs, the local mirror operation at the secondary site is not carried out, thereby reducing the capacity of the secondary storage.

(2) Operation Simplification (2-1) Tendencies of the log application and operation are monitored, and the search process is accepted according to the progress conditions of the log application. When the log application at the secondary site is not followed adequately, the search is not accepted, thereby reducing a possibility of log wrap-around. (2-2) When the consistency guarantee of the secondary DB is carried out, not that Tr that is in process at the moment of the search instruction is undone (rolled back), but that only Tr that is in process at the moment of the search instruction is redone (rolled forward). In this manner, it is unnecessary to create and control the update log by undo, further, at the restart of log application, the process may be redone from the moment of the search instruction, and accordingly, the operation becomes easy.

More specifically, the present invention is applied to a log-based DR system that transfers logs of a DBMS at a primary site to a secondary site by remote copy of a storage, and carries out log application at the secondary site. In the secondary site, a log apply function unit which carries out a log application process, and a search function unit which carries out a search process are connected to the secondary site. The log apply function unit monitors the progress of the log application, and switches to the search function unit at a search request from the search function unit according to the progress of the log application which the log apply function unit monitors, i.e., the DR method. Specifically, in this DR system, the log apply function unit is built in an appliance server, and the search function unit is built in a search server.

The effects obtained by typical aspects of the present invention will be briefly described below.

According to the present invention, it is possible to provide a DR technology that can reduce the device costs and make the operation easier.

BRIEF DESCRIPTIONS OF THE DRAWINGS

FIG. 5A is a diagram showing a search availability judgment method in the DR system according to the first embodiment of the present invention;

FIG. 5B is a diagram showing a suspend time calculation time in the DR system according to the first embodiment of the present invention;

FIG. 8 is a diagram showing an operational flow of a control unit in the DR system according to the second embodiment of the present invention;

FIG. 9A is a diagram showing a screen of a query execution result and execution conditions a search function unit provides in the DR system according to the second embodiment of the present invention;

FIG. 9B is a diagram showing a screen of a query execution result the search function unit provides in the DR system according to the second embodiment of the present invention;

FIG. 11 is a diagram showing an operational flow of a log input unit in a DR system according to a third embodiment of the present invention;

DESCRIPTIONS OF THE PREFERRED EMBODIMENTS

Outline of Embodiments

A DR system according to an embodiment of the present invention adopts the physical application of high speed processing to operate a log apply function by an inexpensive appliance server. With regard to the search function, a server is prepared separately. Log application means dividing server resources, and the influence that the search process gives upon log recovery can be made minimum. Herein, as the server for search at the secondary site, one adopted to the load of search process to be executed may be prepared, and if a heavy search is not carried out constantly, the server may be shared with other operational server. Alternatively, it is known in prior that the load of search process is low, the log apply function may be operated by the search server.

In the secondary storage, a local mirror operation is not carried out for capacity reduction. Therefore, when the search is carried out, after the log apply function makes the secondary DB to the state where Tr consistency is attained, the log application is suspended, and then the secondary DB is taken over to the search function. During the log application, the search cannot be carried out, but the log application process is made into high speed one by parallelization and the like, and if it is sufficiently high speed with respect to the operation of the primary site, much time can be allotted to the search process. When the search is carried out, search availability is first judged by the log apply function. That is, the operations of the primary site and the performance of log application of the secondary site are monitored in ordinary operation, and only when the log application follows up sufficiently, the search-operation is accepted.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
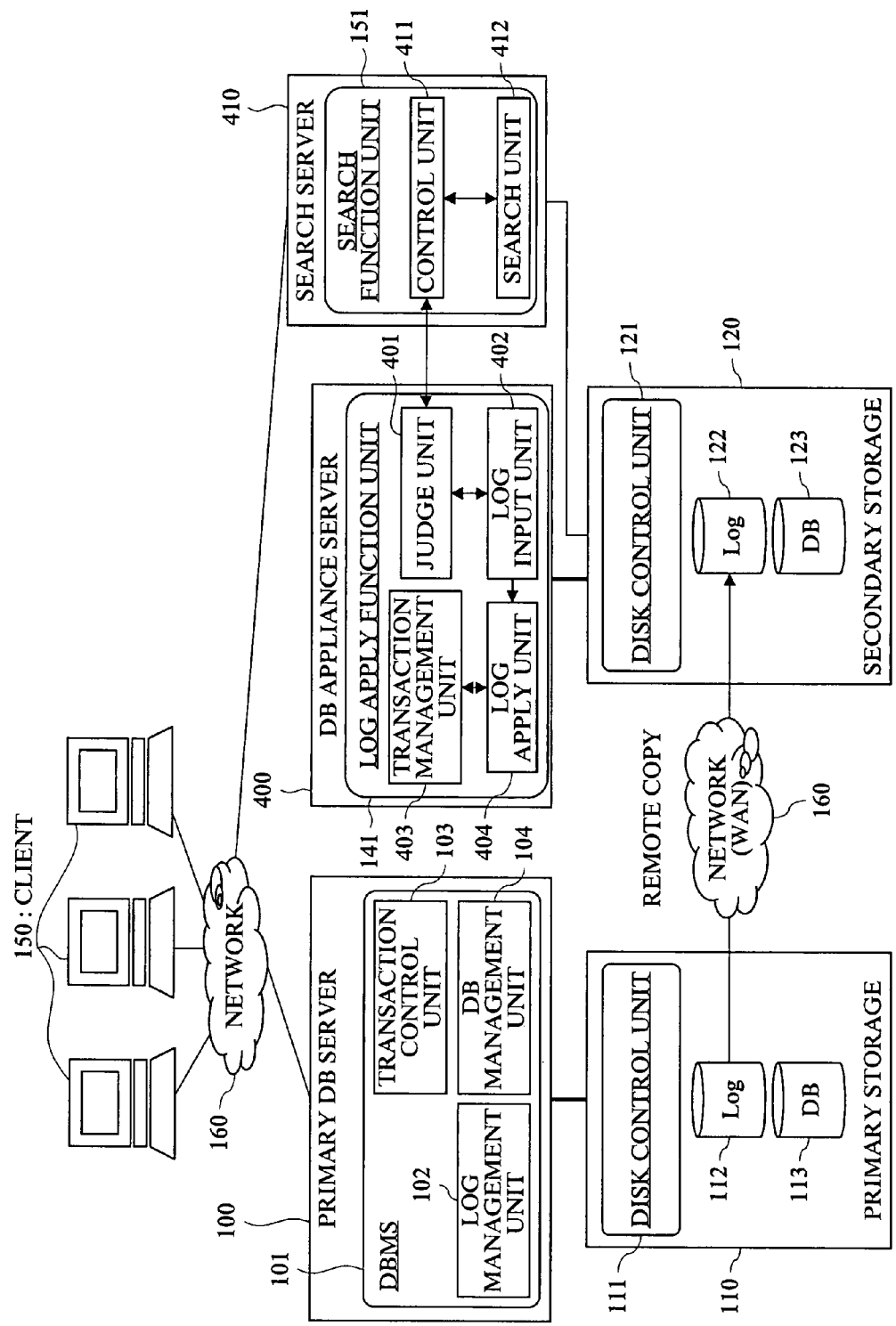
FIG. 1 is a diagram showing a structure of a DR system according to a first embodiment of the present invention.

An example of a structure of a DR system in a first embodiment of the present invention is explained with reference to FIG. 1. FIG. 1 is a diagram showing the structure of the DR system.

The DR system according to the present embodiment is structured by a primary site and a secondary site. The primary site is structured by a primary DB server 100 comprising a computer where a DBMS operates, and a primary storage 110 that is connected to the primary DB server 100 and in which a log file and a DB file of the DBMS are stored. The secondary site is structured by: a DB appliance server 400 comprising a computer where the log apply function operates; a search server 410 comprising a computer where the search function operates; and a secondary storage 120 that is connected to the DB appliance server 400 and the search server 410 and in which a log file and a DB file of the DBMS are stored.

The primary storage 110 of the primary site and the secondary storage 120 of the secondary site are connected via a network (WAN) 160, and the log of the DBMS of the primary site is transferred to the secondary site by remote copy of the storage, and the log application is carried out at the secondary site, and data reproduced by this log application is stored in the secondary storage 120. Further, the primary DB server 100 of the primary site and the search server 410 of the secondary site are connected to a client 150 via the network 160.

At the primary site, in the primary DB server 100, a DBMS 101 operates. And in this DBMS 101: a log management unit 102; a transaction control unit 103; and a DB management unit 104 are arranged. In the primary storage 110 at the primary site: a disk control process unit 111; a log VOL (Log) 112; and a primary DB (DB) 113 are provided.

At the secondary site, a log apply function unit 141 that carries out the log application process operates in the DB appliance server 400. And in this log apply function unit 141: a judge unit 401; a log input unit 402; a transaction management unit 403; and a log apply unit 404 are provided. In the search server 410 at the secondary site, a search function unit 151 that carries out a search process operates, and in this search function unit 151, a control unit 411, and a search unit 412 are provided. In the secondary storage 120 of the secondary site: a disk control process unit 121; a log VOL (Log) 122; and a secondary DB (DB) 123 are provided.

In the DR system structured as above, especially, the log apply function unit 141 of the DB appliance server 400 and the search function unit 151 of the search server 410 have the following features.

(Log Apply Function Unit)

The log apply function unit 141 comprises: the log input unit 402; the transaction management unit 403; the log apply unit 404; and the judge unit 401.

The log input unit 402 monitors the log VOL 122, and continuously receives logs transferred from the primary site, and instructs the apply unit 404 to apply them. The apply unit 404 applies logs, and the transaction management unit 403 manages the execution state of Tr in association with the apply unit 404. The judge unit 401 is a part to control the switching between the log application and the search process, and it monitors the operations at the primary site and log application in the ordinary operation, and judges the execution availability of the search process according to the progress of log application. That is, the judge unit 401 determines the availability of the search process according to the progress of log application, and when the log application follows sufficiently and there is no problem, it switches the control right from the secondary DB 123 to the search function unit 151.

Figure 2A:
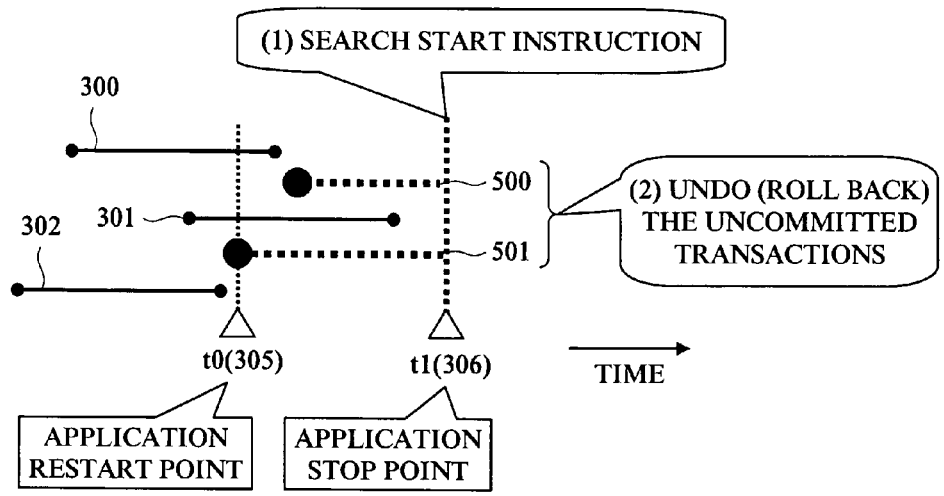
FIG. 2A is a diagram showing a consistency guarantee systems of a secondary DB of a conventional system in the comparison of DR systems of the first embodiment of the present invention and the conventional system.
Figure 2B:
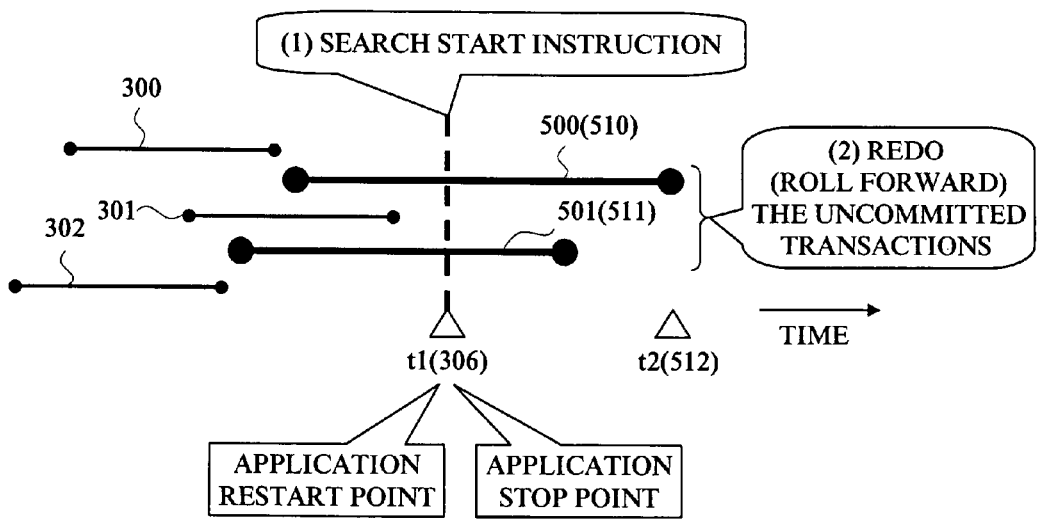
FIG. 2B is a diagram showing a consistency guarantee systems of the secondary DB of the present system in the comparison of DR systems of the first embodiment of the present invention and the conventional system.

When the execution of the search process is permitted, the secondary DB 123 is made into the state where consistency is attained, and then the control right of the secondary DB 123 is switched to the search function unit 151. The consistency guarantee method of the secondary DB 123 by the present method is explained with reference to FIG. 2. In a conventional system (FIG. 2A), when a search start instruction is received at the time point t1 (306), first, uncommitted Tr 500 and 501 are grasped at the time point t1 (306), and the Tr is undone (rolled back) to make the secondary DB 123 into the state where consistency is attained. When the log application is restarted after completion of the search process, the undone Tr must be executed again, and redoing must be made from the oldest Tr 501 among undone Tr, that is, from the time point t0 (305). Note that, 300 to 302 are committed Tr.

While on the other hand, in the present system (FIG. 2B), only uncommitted Tr are redone (rolled forward) at the search start instruction time point t1 (306). That is, when the search start instruction is received at the time point t1 (306), uncommitted Tr 500 and 501 are grasped, and only the logs concerning the Tr are redone (rolled forward). The committed state after redoing is shown by Tr (510 and 511). When the search process is completed, and the log application is restarted, the log application is redone from the time point t1 (306). The present system has merits compared with the conventional system that it does not carry out the undo process, and accordingly, it is not necessary to record update logs with respect to updates added by undoing, and since the application stop point and the application restart point become same, the process and operation become easy.

(Search Function Unit)

In the search server 410, the search function unit 151 operates, and the search function unit 151 is structured by the control unit 411 and the search unit 412. The control unit 411 accepts the search request from a user or AP, and at the request, it issues the search request to the judge unit 401 of the log apply function unit 141. And, only when the search request is permitted, it instructs the search unit 412 to execute the search process.

Hereinafter, the log input unit 402, the transaction management unit 403, the apply unit 404, and the judge unit 401 of the log apply function unit 141, the control unit 411 and the search unit 412 of the search server 410 are explained in details.

(Log Input Unit)

The log input unit 402 accepts the start instruction and suspend instruction from the judge unit 401. After it receives the start instruction, it reads the log, and instructs the apply unit 404 to apply the read log. On the other hand, when it receives the suspend instruction, it makes the secondary DB 123 into the state where consistency is attained, and stands by until the start instruction is input again.

Figure 3:
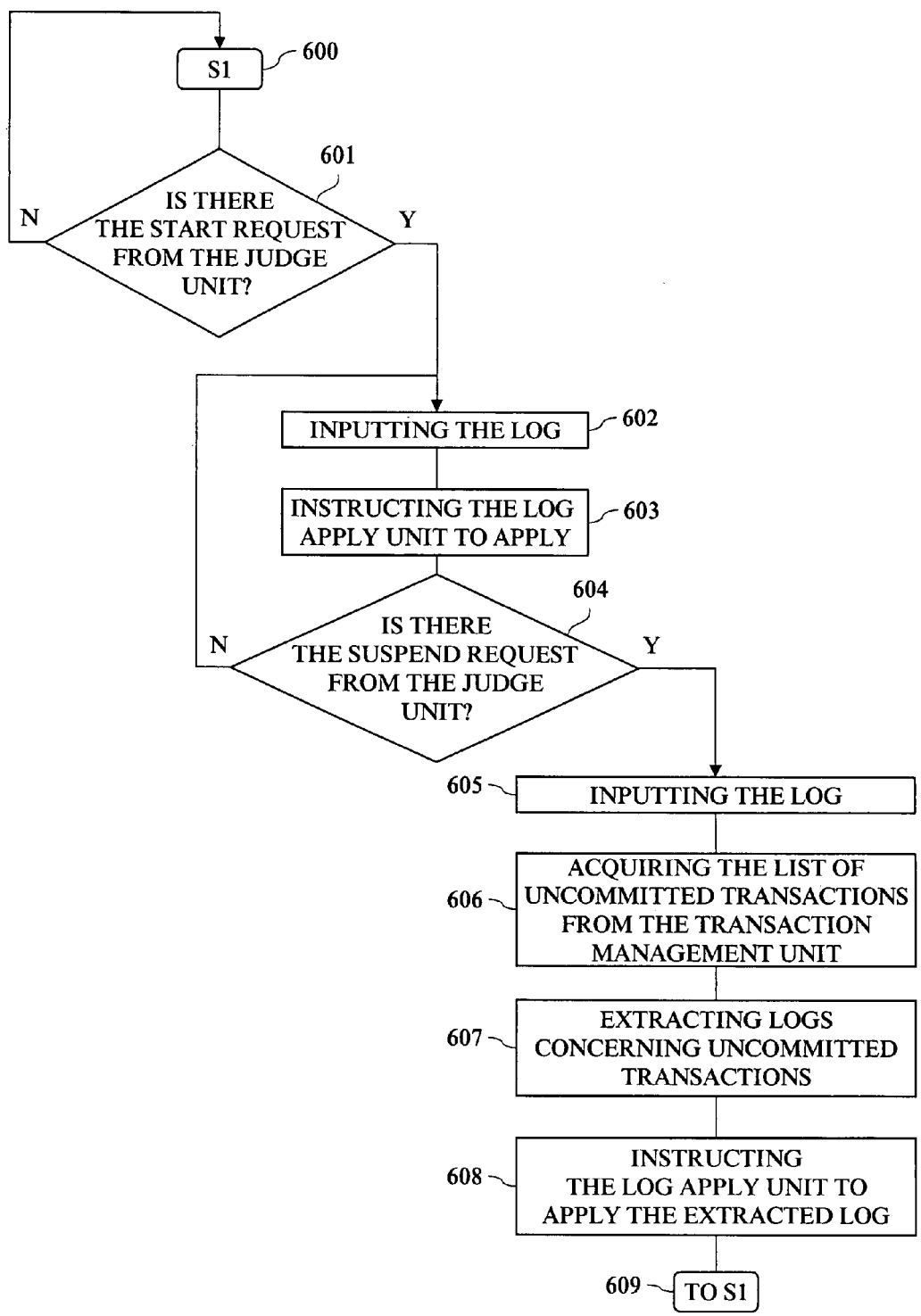
FIG. 3 is a diagram showing an operational flow of a log apply unit in the DR system according to the first embodiment of the present invention.

The action flow of the log input unit 402 is shown in FIG. 3. The log input unit 402 analyzes the instruction from the judge unit 401 at step 601, and when it is the start instruction (Y), it inputs the log from the log VOL 122 (step 602), and instructs the apply unit 404 to apply the inputted log (step 603). The log input unit 402 analyzes the instruction from the judge unit 401 at step 604, and when the instruction is the suspend instruction (Y), it makes the secondary DB 123 into the state where consistency is attained, and stands by until the next start instruction is given.

More specifically, the log input unit 402 first inputs the log (step 605), then makes an interrogation to the transaction management unit 403, and acquires the list (ID of Tr) concerning uncommitted Tr now in process (step 606). Then, the log input unit 402 extracts only the update log concerning the concerned Tr from a log buffer on the basis of the ID of uncommitted Tr (step 607), and instructs the apply unit 404 to apply the update log (step 608). When the application is completed, the log input unit 402 stands by until the next start request comes.

(Transaction Management Unit)

The transaction management unit 403 manages the execution state of Tr, that is, whether it is committed or not. For example, it may be like: a management table is prepared; the condition of the log is inserted to the management table when a log of a certain Tr is read for the first time; and the line inserted before is deleted when the log to commit the Tr is inputted. As a result, it is possible to record the information of Tr uncommitted at the time to the management table.

(Apply Unit)

The apply unit 404 applies the log which the log input unit 402 has read.

(Judge Unit)

The judge unit 401 judges the execution availability of the search process on receiving the request from the search function unit 151 according to the progress condition of the log application, and when the search execution is available, it makes the secondary DB 123 into the state where consistency is attained and switches to the search function unit 151. Further, in prior, it calculates the time during which the log application can be stopped, or, the suspending time during which the search process can be executed. After the lapse of the time, or, when search completion is notified from the search function unit 151, it stops the search process and restarts the log application that was suspended.

Figure 4:
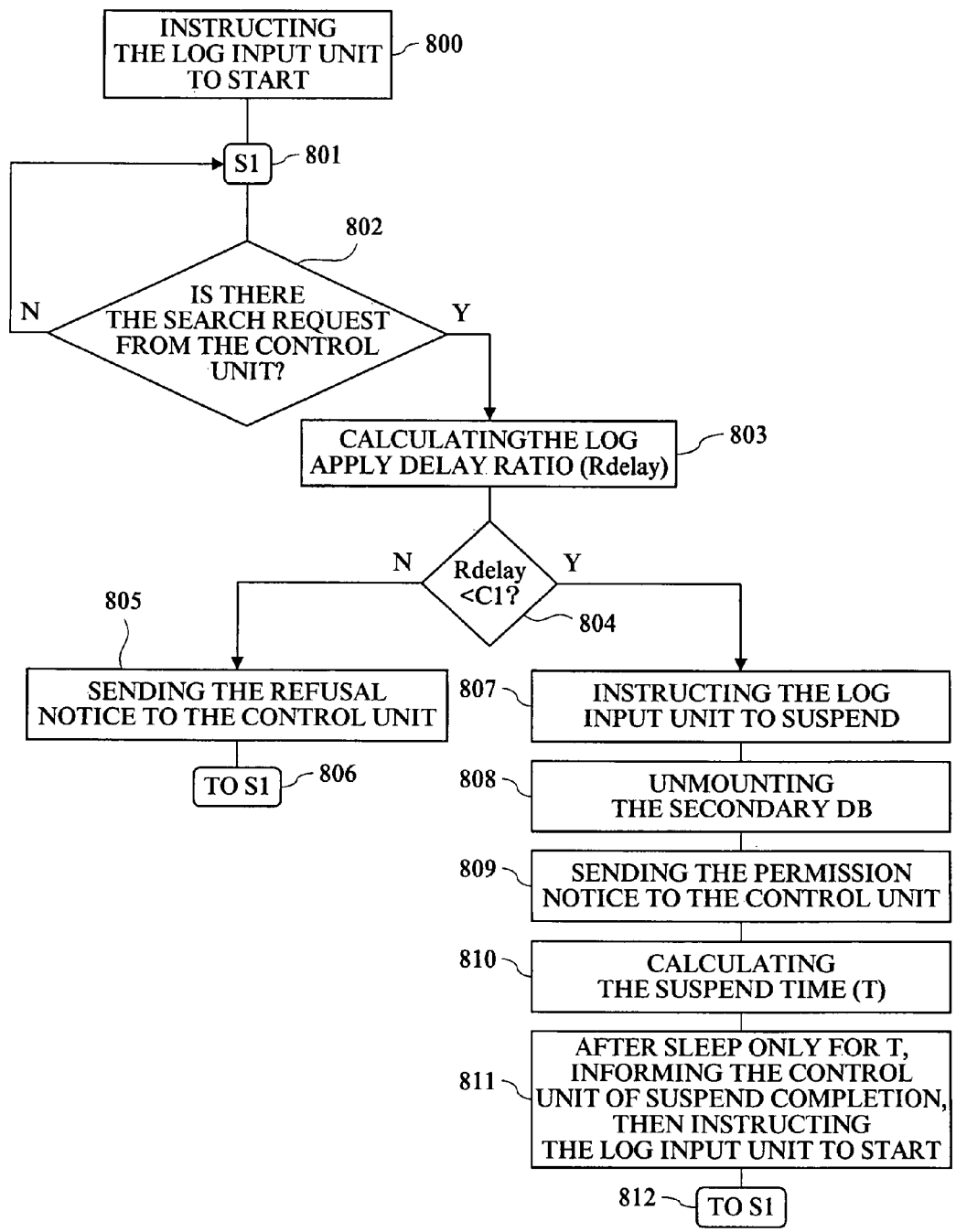
FIG. 4 is a diagram showing an operational flow of a judge unit in the DR system according to the first embodiment of the present invention.

The action flow of the judge unit 401 is shown in FIG. 4. After instructing the log input unit 402 to start (step 800), the judge unit 401 analyzes the instruction from the control unit 411 at step 802, and when there is a search request from the search function unit 151 of the secondary site (Y), it calculates the progress condition of the log application first at step 803, and judges whether it is acceptable or not (step 804).

This judgment on the search availability is, for example, made by calculating the application delay ratio. The image diagram of the search availability judgment is shown in FIG. 5A. The box in the center of the diagram indicates a log file 700, $P_{DB}$ indicates a pointer 701 to the latest log that the DBMS 101 at the primary site generates, and $P_{log}$ indicates a pointer 702 to the latest log that the apply function unit 141 of the secondary site applies. When the size of the log file 700 is LSZ, the delay ratio (Rdelay) is for example calculated by the following equation.

$$R\text{delay}=(P_{DB}-P_{log})/LSZ$$

Only when this delay ratio is smaller than the preset threshold value (C1) (Y) the judge unit 401 judges that the log application catches up sufficiently, and accepts the search. When the delay ratio exceeds C1 (N), it sends the refusal notice to the control unit 411 of the secondary site (step 805).

A DB manager can control the conditions of search availability by changing the value of this C1. As this control method, time may be given. For example, if you want to give conditions where you want to make DB whose delay is within time D as the search objective, you may give a condition where the value obtained by dividing the log delay ($P_{DB}-P_{log}$) by the log output speed ($V_{DB}$) of the primary site is D or below as the condition to accept the search.

When accepting the search, the judge unit 401 first instructs the log input unit 402 to suspend (step 807). The log input unit 402 receives the suspend instruction, and recovers the secondary DB 123 to the state where consistency is attained. When the recovery of the secondary DB 123 is completed, the judge unit 401 unmounts the secondary DB 123 (step 808) and sends the permission notice with respect to the search request to the control unit 411 of the secondary site (step 809).

Next, the judge unit 401 calculates the suspend time (Tsuspend) of the log application at step 810. The concept of the calculation example of the suspend time is shown in FIG. 5B. Now suppose that the search request is accepted in the state of FIG. 5A. During this time (during execution of the search process), operations proceed at the primary site, and the pointer 711 becomes $P_{DB'}$. At this moment, $P_{DB'}-P_{log}$ becomes the delay of the log application. To this delay, an acceptable amount is determined in prior, and the log application is suspended when the delay reaches the acceptable amount.

$$P_{DB'}-P_{log}<=C\max \times LSZ$$

$$(P_{DB}+V_{DB}\times T\text{suspend}-P_{log})<=C\max \times LSZ$$

$$T\text{suspend}<=(C\max \times LSZ+P_{log}-P_{DB})/V_{DB}$$

Note that, Cmax: maximum permissible delay ratio, $V_{DB}$: log creation speed of operations at the primary site.

After sleep only for the suspending time, the judge unit 401 notifies the control unit 411 of suspend completion at step 811, and after confirmation of stop of the search process, it instructs the log input unit 402 to start to restart the log application process.

Meanwhile, although not illustrated in FIG. 4, when the search completion notice is issued from the control unit 411, the log application is restarted even if the suspend time is not over.

(Control Unit)

The control unit 411 accepts the search request from the user/AP, and issues the search request to the judge unit 401. When the judge unit 401 issues the search permission notice, it instructs the search unit 412 to execute the search process.

Figure 6:
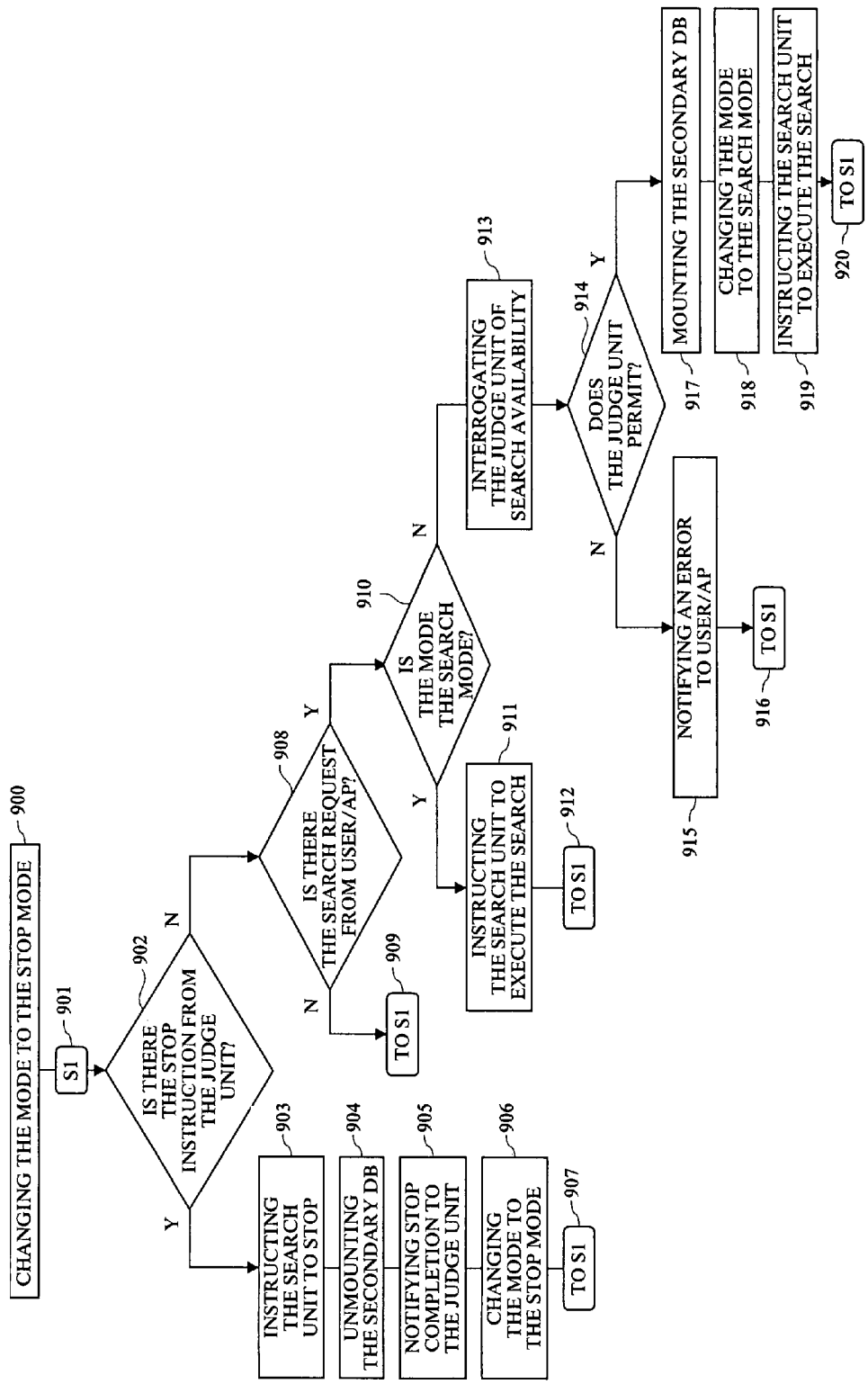
FIG. 6 is a diagram showing an operational flow of a control unit in the DR system according to the first embodiment of the present invention.

The action flow of the control unit 411 is shown in FIG. 6. The control unit 411 has search/stop modes. When the control unit 411, after changing to stop mode (step 900), receives the stop instruction from the judge unit 401 at step 902 (Y), if the search process is now in execution, it instructs the search unit 412 to cancel the execution of stop (step 903). Then, the control unit 411 unmounts the secondary DB 123 (step 904), and then notifies stop completion to the judge unit 401 (step 905), and finally changes the mode to the stop mode (step 906).

On the other hand, when the control unit 411 receives the search request from the user/AP at the step 908 (Y), it first checks whether the mode is the search mode (step 910). If the mode is already the search mode (Y), it instructs the search unit 412 to execute the search corresponding to the next search request directly (step 911). If the mode is the stop mode at the step 910 (N), an interrogation of search availability is given to the judge unit 401 (step 913).

Then, when the permission notice is obtained from the judge unit 401 at the step 914 (Y), the control unit 411 mounts the secondary DB 123 (step 917) and changes the mode into the search mode (step 918), and finally instructs the search unit 412 to execute the search (step 919). On the other hand, when the permission notice is not obtained at the step 914 (N), it notifies an error to the user/AP (step 915).

(Search Unit)

The search unit 412 executes the search process according to the instruction of the control unit 411. This can be realized by executing only the search process by, for example, a normal DBMS.

As explained above, according to the DR system of the present embodiment, at the secondary site, the DB appliance server 400 where the log apply function unit 141 operates, and the search server 410 where the search function unit 151 operates are connected to the secondary storage 120, therefore the following effects can be attained.

(1) When the search is not carried out, the physical application where the log recovery is available by the inexpensive DB appliance server 400 is adopted, and accordingly it is possible to reduce the server costs. Further, since the local mirror operation is not carried out at the secondary site, it is possible to reduce the capacity of the secondary storage 120, thereby reducing the storage costs. As a result, it is possible to reduce the device costs.

(2) The tendencies of the log application and operations are monitored by the log apply function unit 141, and the search process is accepted according to the progress conditions of the log application, and when the log application at the secondary site does not catch up sufficiently, the search is not accepted, thereby it is possible to reduce the possibility of the log wrap-around. Further, when the consistency guarantee of the secondary DB 123 is carried out, not the Tr in process at the moment of search instruction is undone (rolled back), but only the Tr in process at the moment of search instruction is redone (rolled forward), thereby it is unnecessary to create and manage the update log by undoing, furthermore, at the moment of log application restarting, redoing is made from the moment of search instruction, thereby making the operation easy. As a result, it is possible to make the operation simple.

Second Embodiment

In the first embodiment, even when there is the search request, if the log application progress is not sufficient, the request is rejected. While on the other hand, in a second embodiment, even when the log application progress is not sufficient, the search is accepted and carried out when the log application catches up. At this moment (when the log application progress is not sufficient and the search is carried out after the search request), the scheduled time of search execution is sent back to the user and AP that made the request.

Hereinafter, with regard to a DR system according to the present embodiment, the portions different from the first embodiment are explained in details. Meanwhile, the DR system according to the present embodiment has the same structure as that in FIG. 1, and the same reference numbers as in FIG. 1 are used.

(Judge Unit)

Figure 7:
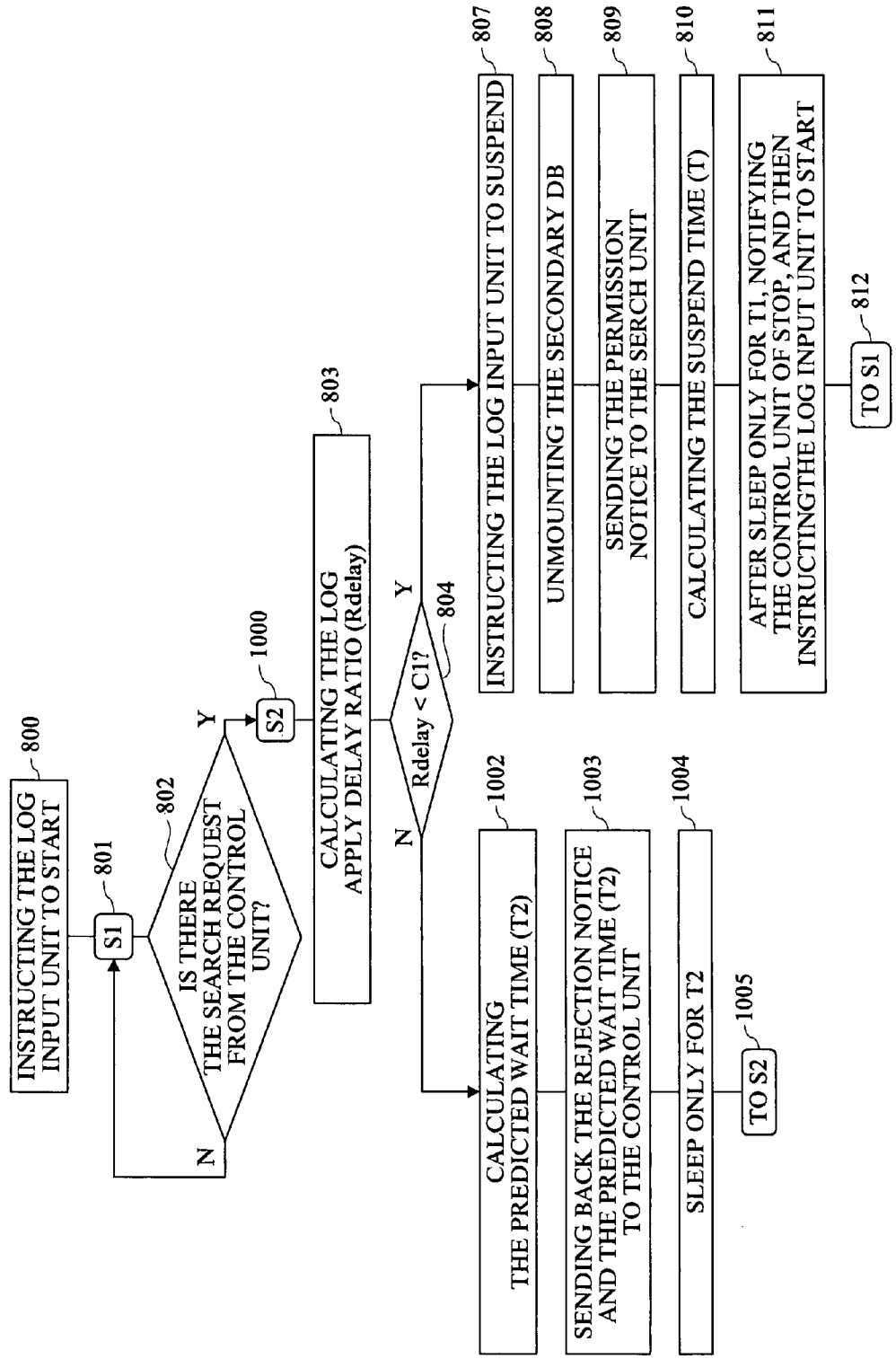
FIG. 7 is a diagram showing an operational flow of a judge unit in a DR system according to a second embodiment of the present invention.

In the Judge unit 401, only a process in a case where it is judged that the log application progress is not sufficient is different from the above first embodiment. The action flow of the judge unit 401 is shown in FIG. 7. At step 804, when it is judged that the log application progress is not sufficient and the search cannot be executed at once (N), the judge unit 401 calculates the standby time (T2) during which it is expected the search becomes available (step 1002).

For example, when the time during which the search becomes available is defined as T2, the conditions of the log output of the primary site and the log application of the secondary site become as described below respectively.

$$P_{DB"}=P_{DB}+V_{DB} \times T2$$

$$P_{log"}=P_{log}+V_{log} \times T2$$

And so at this moment, it is sufficient when the following is satisfied.

$$P_{log"}-P_{DB"}<C1 \text{ (threshold value)}$$

Therefore, T2 is the following.

$$T2>(C1-(P_{log}-P_{DB}))/(V_{log}-V_{DB})$$

Further, the judge unit 401 sends back the rejection notice and the scheduled standby time (T2) to the control unit 411 at step 1003. And after only sleep for T2 (step 1004), the judge unit 401 calculates the catch-up condition again at step 803, and when it catches up sufficiently at the step 804 (Y), it makes the secondary DB 123 into the state where consistency is attained at the step 807 and the subsequent, and switches the control right from the secondary DB 123 to the search function unit 151.

(Control Unit)

Also with regard to the control unit 411, portions different from the first embodiment are mainly explained. The action flow of the control unit 411 is shown in FIG. 8. In the control unit 411, to correspond a query to which the request is not accepted at once, the query is queued. That is, when there is the search request from the user/AP at the step 908 (Y), the control unit 411 first registers the query (search contents) to the queue (step 1101).

Next, the control unit 411 checks whether the mode is the search mode at step 910, and when the mode is already the search mode and having the control right of the secondary DB 123 (Y), it acquires the query from the queue (step 1102), and instructs the search unit 412 to execute the search of the query (step 911).

On the other hand, according to the judgment of the step 910, the control unit 411 asks the judge unit 401 to judge the search availability when the mode is not the search mode (N) (step 914). At the judgment at the step 914, the control unit 411 mounts the secondary DB 123 when the search execution is permitted (Y) (step 917) and changes the mode to the search mode (step 918), and acquires the query from the queue at step 1104, and instructs the search unit 412 to execute the search of the query (step 919). On the contrary, at the judgment at the step 914, when the judge unit 401 does not permit the search (N), the control unit 411 presents the scheduled execution time that the judge unit 401 calculates to the user/AP (step 1103).

Further, when there is a stop instruction from the judge unit 401 at the judgment at the step 902 (Y) and when the query is executed at that moment, the control unit 411 instructs the search unit 412 to stop the execution of the query (step 903) and registers the aborted query to the queue again (step 1100).

The search function unit 151 can provide such I/F as shown in FIG. 9 to user. The screen (Query) 1200 shown in FIG. 9A shows the execution result and the execution condition of the query.

For example, if it is a query that completes execution, there are: the contents of the query (1201); the time at which the query is registered (1202); the execution time predicted by the judge unit (1203); the time of actual execution (1204); the time of the secondary DB (1205: the time when the log application is suspended; and the value obtained based on the time stamp at the primary DB server recorded in the log); and a link to the execution result (1206). When this link (1206) is selected, it becomes possible to refer to the screen (Result) 1220 showing the execution result shown in FIG. 9B.

Further, when the query is only registered in the queue and not executed yet, only the query contents (1207), the registration time (1208), and the execution time predicted by the judge unit (1209) are displayed, and the execution time (1210), the DB time (1211), and the execution result (1212) are updated when the execution is actually made.

As explained above, according to the DR system of the present embodiment, the same effects as those in the above first embodiment can be attained. At the same time, even when the log application progress is not sufficient, the search is accepted, and the scheduled time of the search execution is sent back to the user and AP that made request, and when the log apply catches up, the search can be executed.

Third Embodiment

In the above first and second embodiments, the consistency guarantee process and the search process of the secondary DB are carried out according to the request from the user and AP as a trigger. In a third embodiment, on the basis of the process of the primary site, the consistency guarantee of the secondary DB is carried out automatically, and the secondary DB with consistency is provided to the search function unit. In concrete, the checkpoint processing carried out at the primary site is made the trigger.

Hereinafter, with regard to a DR system according to the present embodiment, the portions different from the first and second embodiments are explained in details. Meanwhile, the DR system according to the present embodiment has the same structure as that in FIG. 1, and same reference numbers as in FIG. 1 are used.

Figure 10A:
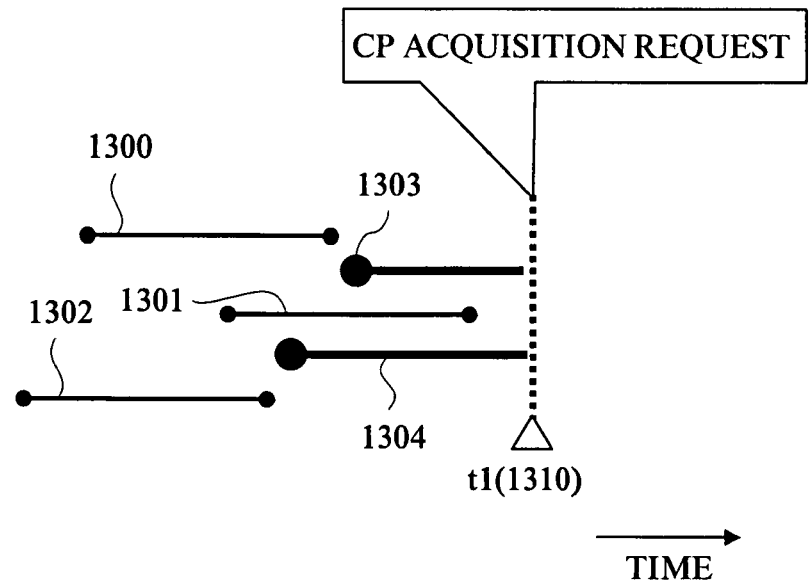
FIG. 10A is a diagram showing a checkpoint processing at the checkpoint acquisition request in a DR system according to a third embodiment of the present invention.
Figure 10B:
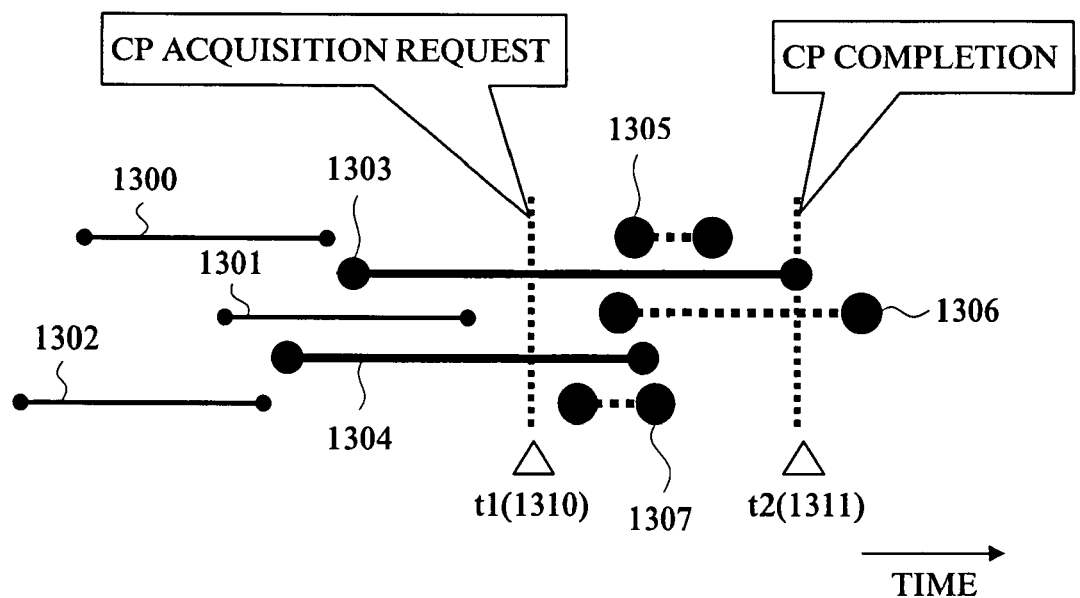
FIG. 10B is a diagram showing a checkpoint processing at the checkpoint completion in the DR system according to the third embodiment of the present invention.

The checkpoint (CP) processing is shown in FIG. 10. At the checkpoint, first a CP acquisition request is sent out. Herein, although there is a method (FIG. 10A) where other online processes are stopped and Tr 1303 and 1304 uncommitted at that moment are committed, in order to make the influence upon the online process minimum, the process is continued as it is as shown in FIG. 10B. At the time point t2 (1311) at which all the Tr uncommitted at the CP acquisition time point t1 (1310) are all completed, the CP is completed. In the present embodiment, logs are outputted at the CP acquisition request and CP completion respectively. That means, Tr 1303 and 1304 uncommitted at the CP acquisition request time point t1 (1310) are redone (rolled forward) and made into committed state. In this case, Tr 1303 ends at the CP completion time point t2 (1311). Herein, in the primary site, there are also Tr to be started after t1, and 1305 to 1307 shows this example. However, in the secondary site, if these Tr are also redone (rolled forward), they may become inconsistent (for example, Tr 1306 is not committed yet at the CP completion time point t2), therefore Tr 1305 to 1307 are not redone (rolled forward).

(Log Input Unit)

The action flow of the log input unit 402 is shown in FIG. 11. The log input unit 402 inputs the log at step 602, and judges whether there is a CP log or not (step 1400). When there is no CP log in read logs (N), it instructs the apply unit 404 to apply the read log at the step 1401. When there is a CP log (Y), first it instructs to apply the logs until the CP acquisition log (step 1403).

Next, the log input unit 402 acquires the list of uncommitted Tr from the transaction management unit 403 (step 606), and extracts only logs concerning the uncommitted Tr among the read logs (step 1404), instructs the apply unit 404 to apply the extracted logs (step 608), and when the application is completed, it notifies the judge unit 401 that the search request is available (step 1405).

Further, at step 1406, the judge unit 401 carries out a search availability judgment on the basis of the log application progress. And when the search is available (Y), it suspends the log application, and stands by until there comes a start request from the judge unit 401 (step 1409). On the other hand, when the permission is not obtained (N), it instructs the log application even after the CP acquisition log (step 1407), and continues executing the log application without change.

(Judge Unit)

Figure 12:
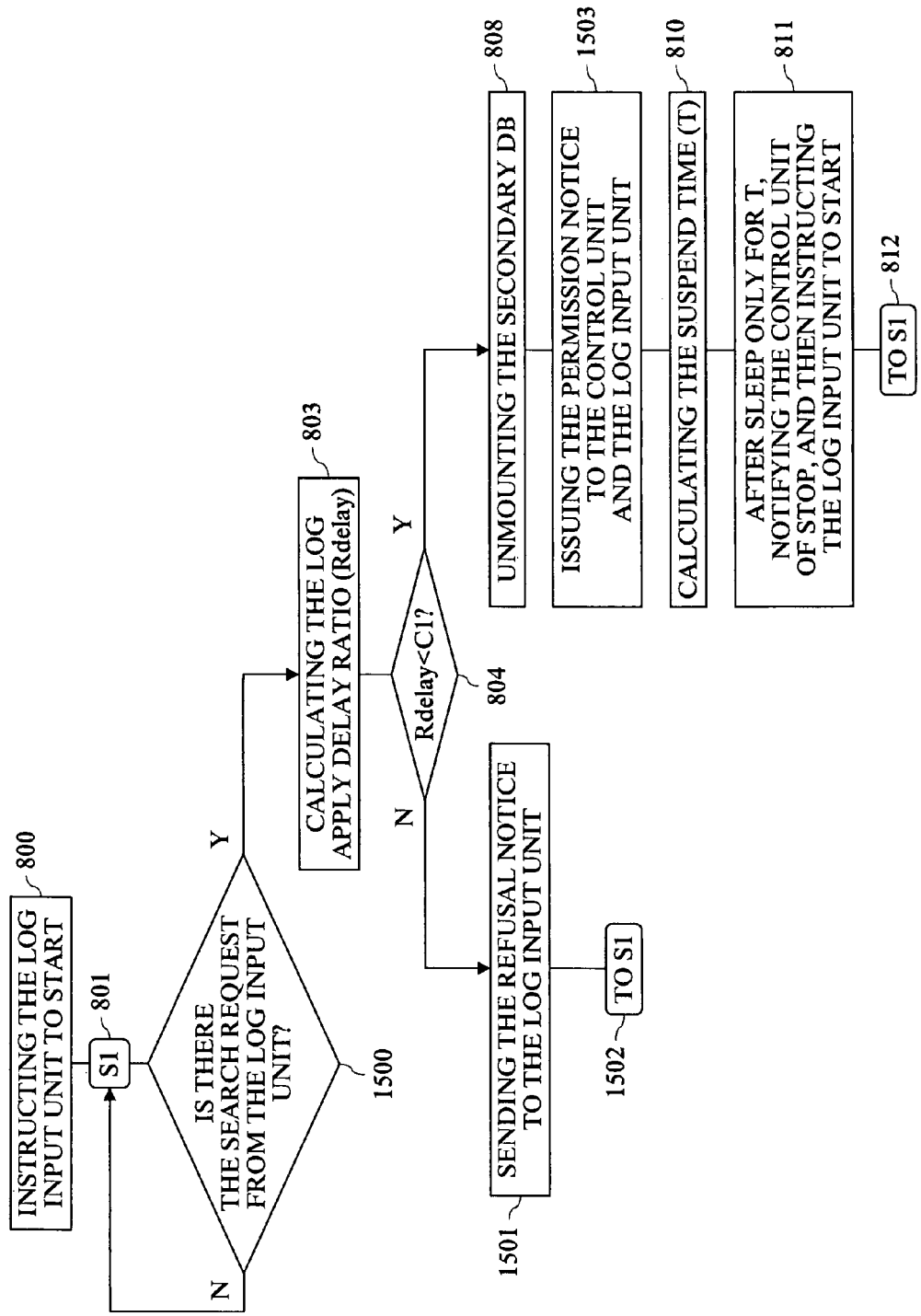
FIG. 12 is a diagram showing an operational flow of a judge unit in the DR system according to the third embodiment of the present invention.

The action flow of the judge unit 401 is shown in FIG. 12. In the judge unit 401, at step 1500, it accepts the search request not from the search function unit 151, but from the log input unit 402. When there is a search request (Y), the search availability judgment is carried out according to the conditions of log application progress.

The judge unit 401 calculates, for example, the log application delay ratio (Rdelay) (step 803) and compares it with the predetermined threshold value (C1) to carry out the judgment (step 804). When the catching up of log application is not sufficient (N), it sends the refusal notice telling that the search is not available to the log input unit 402 at step 1501. When it is judged that the catching up is sufficient and the search is available (Y), it unmounts the secondary DB 123 (step 808), and issues the permission notice telling that the search can be executed to the control unit 411 and the log input unit 402 (step 1503). Then, the judge unit 401 calculates the suspending time (T) (step 810), after carrying out sleep only for the time, it notifies the control unit 411 to stop the search, and then sends the start instruction to the log input unit 402 (step 811).

(Control Unit)

Figure 13:
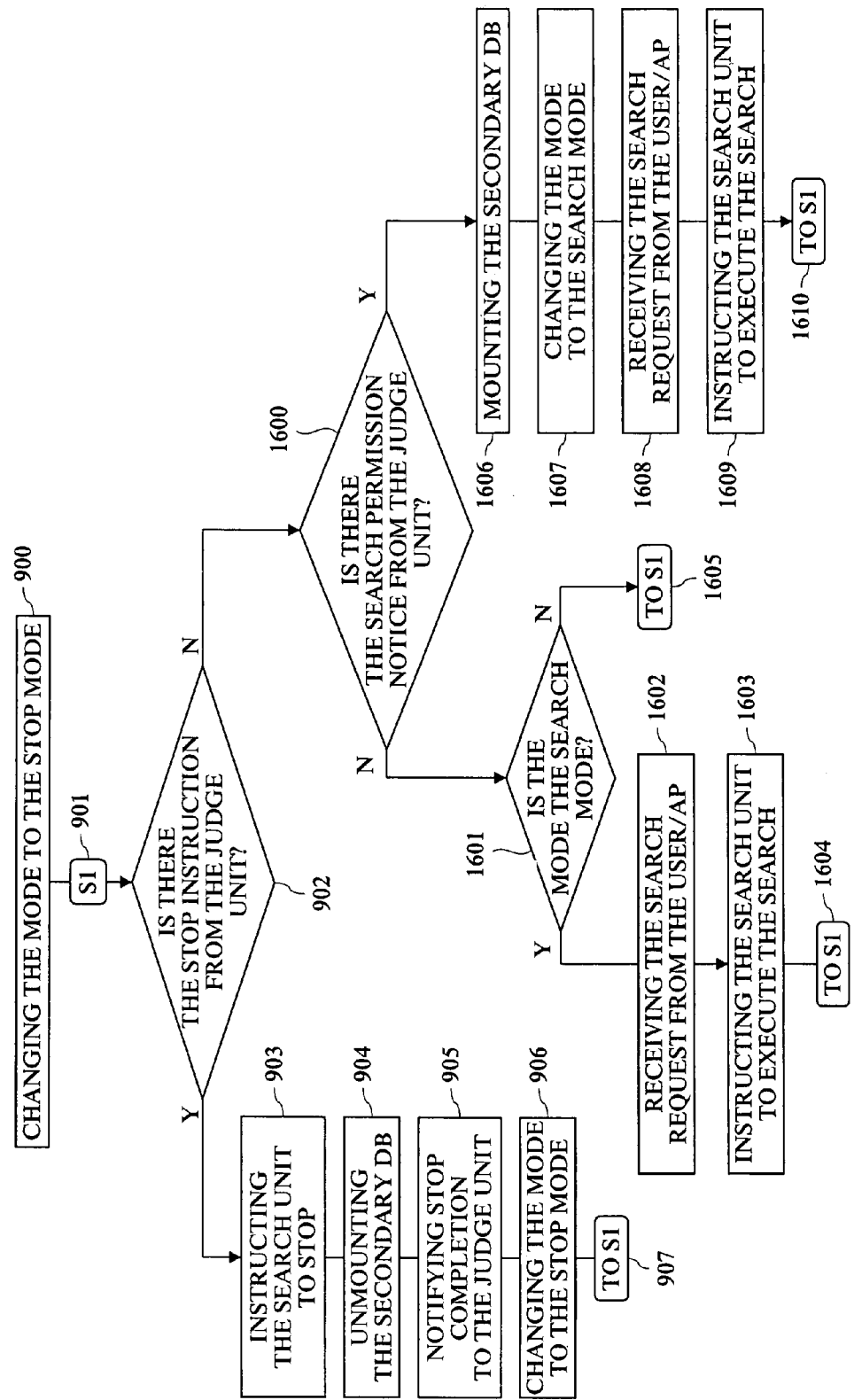
FIG. 13 is a diagram showing an operational flow of a control unit in the DR system according to the third embodiment of the present invention.
Figure 14B:
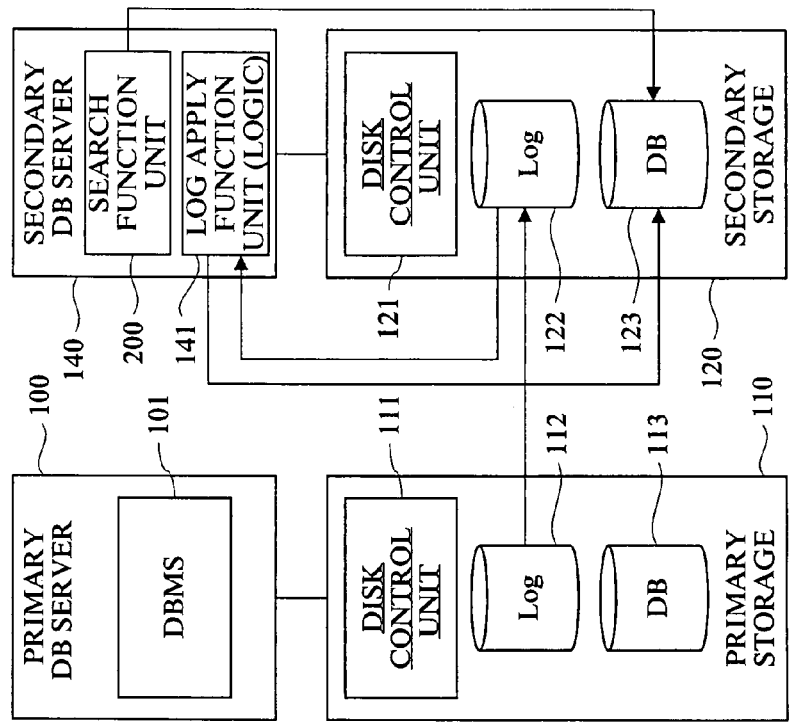
FIG. 14B is a diagram showing a structure of a DR system in a conventional system of logical application) with respect to the present invention.
Figure 14A:
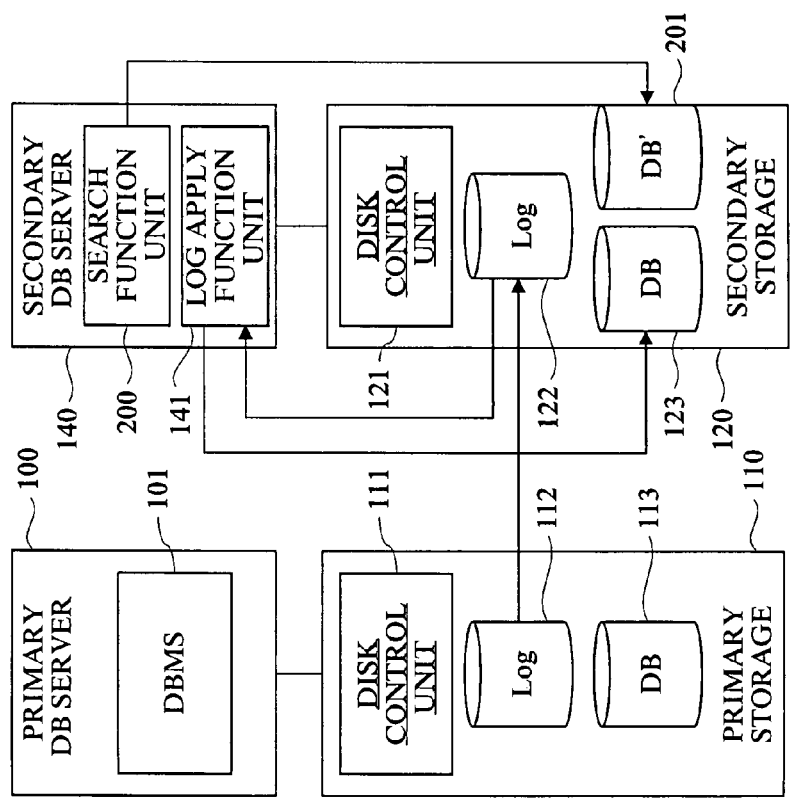
FIG. 14A is a diagram showing a structure of a DR system in a conventional system of physical application+local mirror operation with respect to the present invention.
Figure 15A:
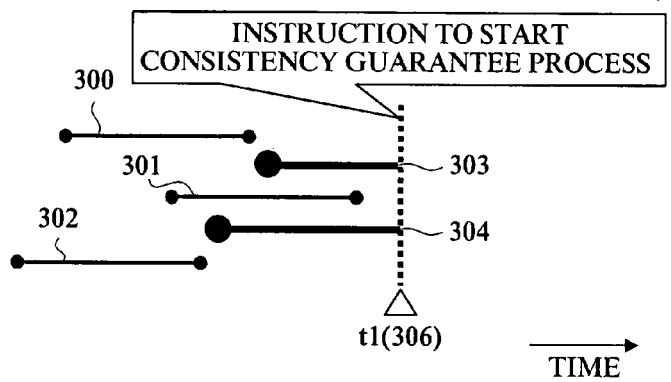
FIG. 15A is a diagram showing a consistency guarantee process of a secondary DB at start in a DR system in a conventional system with respect to the present invention.
Figure 15B:
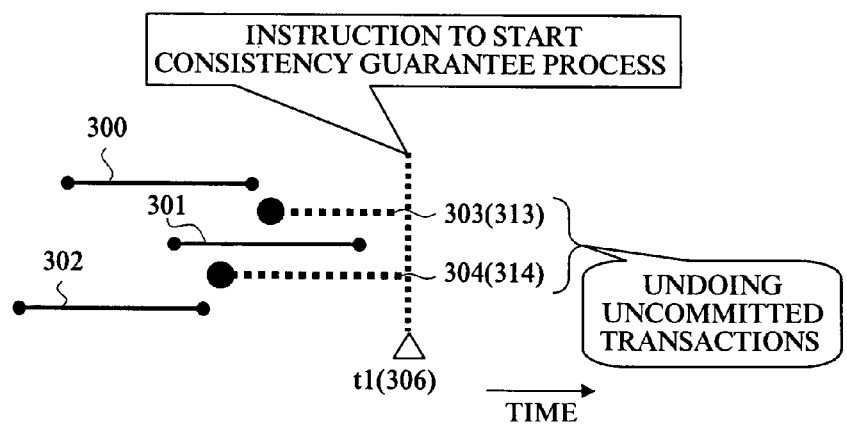
FIG. 15B is a diagram showing the consistency guarantee process of the secondary DB at end in the DR system in the conventional system with respect to the present invention.
Figure 15C:
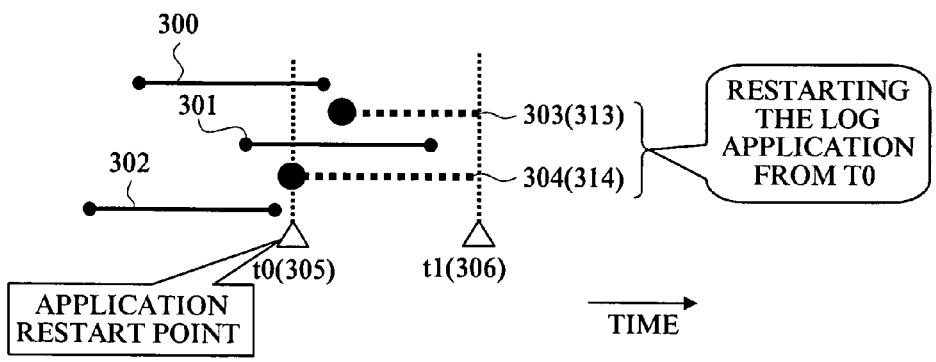
FIG. 15C is a diagram showing a process at restart of a log application in the DR system in the conventional system with respect to the present invention.

The control unit 411 accepts the request from the user only when the search execution is available. The action flow of the control unit 411 is shown in FIG. 13. The control unit 411 receives the notice from the judge unit 401 at step 1600, and when the search is permitted (Y), it mounts the secondary DB 123 (step 1606), changes the mode to the search mode (step 1607), receives the search request from the user/AP (step 1608), and instructs the search unit 412 to execute the search (step 1609). When there is no permission notice at the judgment at the step 1600 (N), it first checks whether the mode is already the search mode (step 1601), and when the mode is the search mode (Y), it accepts the search request from the user/AP (step 1602), and instructs the search unit 412 to carry out the search (step 1603).

As explained heretofore, according to the DR system of the present embodiment, the same effects as those in the above first and second embodiments can be attained, and it is possible to automatically perform the consistency guarantee of the secondary DB 123 with the checkpoint processing carried out at the primary site, and provide the secondary DB 123 having consistency to the search function unit 151.

In the foregoing, the invention made by the inventors of the present invention has been concretely described based on the embodiments. However, it is needless to say that the present invention is not limited to the foregoing embodiments and various modifications and alterations can be made within the scope of the present invention.

The DR technology according to the present invention can be applied to the log apply function and the search function at a secondary site, and be used in banking business, large companies, and general companies and the like taking the Tr processing systems and DR structures.

What is claimed is:

1. A log-based system for disaster recovery, the log-based system comprising:
a primary database server maintaining a database in a primary storage, generating, by a processor, log records describing modifications of the database, storing the log records in a log file formed in the primary storage, and transferring the log records to a secondary storage in which a remote copy of the log file is stored; and
a secondary database server storing a remote copy of the database in the secondary storage and maintaining the remote copy of the database according to the log records stored in the remote copy of the log file, the secondary database server including a log apply component and a search component wherein
the log apply component includes a log application unit applying the modifications described in the log records to the remote copy of the database stored in the secondary storage by sequentially reading out the log records from the remote copy of the log file,
the search component receives a request for a search of the remote copy of the database stored in the secondary storage and accessing the remote copy of the database to perform the search upon suspension of the log application unit, and
the log apply component includes a judge unit monitoring a progress condition of application of the modifications to the remote copy of the database by the log application unit based on the log record being generated by the primary database server and suspending operation of the log application unit upon recognizing that the progress condition is acceptable to thereby permit the search component to access the remote copy of the database to perform the search,
wherein the search component issues the request for the search to the judge unit
wherein the judge unit monitors the progress condition upon receiving the request for the search from the search component,
wherein the judge unit, upon recognizing that the progress condition is acceptable, ensures that the remote copy of the database is in a state in which consistency will be attained, calculates a suspend time period during which the log application unit is permitted to be suspended, and suspends the log application unit for the suspend time period to thereby permit the search component to access the remote copy of the database to perform the search,
wherein the judge unit restarts the log application unit upon completion of the search by the search component or stops the search and restarts the log application unit upon expiration of the suspend time period,
wherein the judge unit monitors the progress condition of the log application unit by calculating an application delay ratio according to a most recent modification applied to the remote copy of the database by the log application unit and a most recent log record stored in the log file, and
wherein the judge unit recognizes that the progress condition of the log application unit is acceptable when the application delay ratio is less than a predetermined threshold.

2. The log-based system for disaster recovery according to claim 1,
   wherein the judge unit ensures that the remote copy of the database is in a state in which consistency will be attained by directing the log apply component to complete application of each uncommitted modification currently being applied to the remote copy of the database stored in the secondary storage at a time corresponding to when the judge unit recognizes that the progress condition is acceptable.

3. The log-based system for disaster recovery according to claim 1,
   wherein the search component comprises a control unit and a search unit, and
   wherein the control unit receives the request for the search of the remote copy of the database stored in the secondary storage, issues the request for the search to the judge unit, and directs the search unit to access the remote copy of the database to perform the search upon the log apply component having ensured that the remote copy of the database is in a state in which consistency will be attained.

4. The log-based system for disaster recovery according to claim 1,
   wherein the judge unit calculates the suspend time period based on a most recent modification applied to the remote copy of the database by the log application unit, a most recent log record stored in the log file a predetermined acceptable amount of log application delay, that ensures the remote copy of the database is in a condition in which consistency will be attained, and a log record generating speed of the primary database server.

5. The log-based system for disaster recovery according to claim 3,
   wherein the judge unit stops the search upon expiration of the suspend time period by transmitting a stop instruction to the control unit, and
   wherein the control unit, upon receiving the stop instruction, directs the search unit to cancel performance of the search if the search unit has not completed the search and sends a search cancellation notification to the judge unit upon performance of the search by the search unit being canceled.

6. The log-based system for disaster recovery according to claim 1,
   wherein the search component issues the request for the search to the judge unit,
   wherein the judge unit, upon receiving the request for the search from the search component, monitors the progress condition to determine whether the progress condition is acceptable,
   wherein the judge unit, upon determining that the progress condition is not acceptable, calculates a search availability time at which the progress condition is expected to be acceptable, sends a rejection notification including the search availability time to the search component, and continues monitoring the progress condition to determine whether the progress condition is acceptable,
   wherein the judge unit, upon recognizing that the progress condition is acceptable, ensures that the remote copy of the database is in a state in which consistency will be attained, calculates a suspend time period during which the log application unit is permitted to be suspended, and suspends the log application unit for the suspend time period to thereby permit the search component to access the remote copy of the database to perform the search, and
   wherein the judge unit restarts the log application unit upon expiration of the suspend time period.

7. The log-based system for disaster recovery according to claim 6,
   wherein the search component comprises a control unit and a search unit,
   wherein the control unit receives the request for the search of the remote copy of the database at the secondary database server, issues the request for the search to the judge unit, and receives the rejection notice from the judge unit upon the judge unit determining that the progress condition is not acceptable,
   wherein the control unit, upon receiving the rejection notice, adds the request for the search to a search queue and issues the request for the search to the judge unit again upon reaching the search availability time, and
   wherein the control unit directs the search unit to access the remote copy of the database to perform the search upon the judge unit having suspended the log application unit.

8. The log-based system for disaster recovery according to claim 1,
   wherein the judge unit receives checkpoint logs and, upon receiving a checkpoint log, ensures that the remote copy of the database is in a state in which consistency will be attained, and, upon ensuring that the remote copy of the database is in a state in which consistency will be attained, sends a search availability notification to the search component, and
   wherein the search component accepts the request for the search upon receiving the search availability notification and, upon accepting the request for the search, issues the request for the search to the judge unit.

9. The log-based system for disaster recovery according to claim 8,
   wherein the judge unit ensures that the remote copy of the database is in a state in which consistency will be attained by directing the log apply component to complete application of each uncommitted modification currently being applied to the remote copy of the database at the secondary database server at a time corresponding to when the judge unit receives the checkpoint log.

10. The log-based system for disaster recovery according to claim 8,
    wherein the judge unit monitors the progress condition upon receiving the request for the search from the search component, and
    wherein the judge unit, upon recognizing that the progress condition is acceptable, calculates a suspend time period during which the log application unit is permitted to be suspended, and suspends the log application unit for the suspend time period to thereby permit the search component to access the remote copy of the database to perform the search.

11. The log-based system for disaster recovery according to claim 8,
    wherein the search component comprises a control unit and a search unit,
    wherein the control unit directs the search unit to access the remote copy of the database to perform the search upon the judge unit having suspended the log application unit for the suspend time period, and
    wherein the judge unit restarts the log application unit upon completion of the search by the search component or stops the search and restarts the log application unit upon expiration of the suspend time period.

12. A computer-implemented method of log-based disaster recovery for a system in which a database is maintained in a primary storage by a first database server and a remote copy of the database is maintained in a secondary storage by a secondary database server, the method comprising:

generating log records describing modifications of the database;

storing the log records in a log file formed in the primary storage;

transferring the log records to a secondary storage in which a remote copy of the log file is stored;

applying the modifications described in the log records to the remote copy of the database stored in the secondary storage by sequentially reading out the log records from the remote copy of the log file;

receiving a request for a search of the remote copy of the database; judging a progress condition of application of the modifications to the remote copy of the database based on the generated log records stored in the log file formed in the primary storage upon the receiving the request for the search to determine whether the progress condition is acceptable for performing the search;

suspending application of the modifications to the remote copy of the database upon recognizing that the progress condition is acceptable for performing the search; and accessing the remote copy of the database to perform the search suspension of the application of the modifications to the remote copy of the database, wherein suspending application of the modifications to the remote copy of the database comprises ensuring that the remote copy of the database is in a state in which consistency will be attained, calculating a suspend time period during which application of the modifications to the remote copy of the database is permitted to be suspended, and suspending application of the modifications to the remote copy of the database for the suspend time period, and further comprising restarting application of the modifications to the remote copy of the database upon completion of the search or stopping performance of the search and restarting application of the modifications to the remote copy of the database upon expiration of the suspend time period;

wherein judging the progress condition of application of the modifications to the remote copy of the database comprises calculating an application delay ratio according to a most recent modification applied to the remote copy of the database and a most recent log record stored in the log file and recognizing that the progress condition is acceptable when the application delay ratio is less than a predetermined threshold.

13. The method according to claim 12, wherein ensuring that the remote copy of the database is in a state in which consistency will be attained comprises completing application of each uncommitted modification currently being applied to the remote copy of the database at a time corresponding to when the progress condition is recognized as being acceptable.

14. The method according to claim 12, wherein calculation of the suspend time period is based on a most recent modification applied to the remote copy of the database, a most recent log record stored in the log file, a log file output state of the primary database server, a predetermined acceptable amount of log application delay, and a log record generating speed.

15. The method according to claim 14, further comprising cancelling performance of the search upon expiration of the suspend time period if performance of the search is not completed.

16. The method according to claim 12, wherein suspending application of the modifications to the remote copy of the database comprises ensuring that the remote copy of the database is in a state in which consistency will be attained, calculating a suspend time period during which application of the modifications to the remote copy of the database is permitted to be suspended, and suspending application of the modifications to the remote copy of the database for the suspend time period, further comprising, upon determining that the progress condition of application of the modifications to the remote copy of the database is not acceptable for performing the search, calculating a search availability time at which the progress condition is expected to be acceptable, and continuing judging the progress condition of application of the modifications to the remote copy of the database to determine whether the progress condition is acceptable for performing the search, and further comprising restarting application of the modifications to the remote copy of the database upon expiration of the suspend time period.

17. The method according to claim 16, further comprising, upon determining that the progress condition is not acceptable, adding the request for the search to a search queue and judging the progress condition of application of the modifications to the remote copy of the database to determine whether the progress condition is acceptable for performing the search upon reaching the search availability time.

18. The method according to claim 12, further comprising receiving checkpoint logs and, upon receiving a checkpoint log, ensuring that the remote copy of the database is in a state in which consistency will be attained, and further comprising, upon ensuring that the remote copy of the database is in a state in which consistency will be attained, calculating a suspend time period during which application of the modifications to the remote copy of the database is permitted to be suspended, and suspending application of the modifications to the remote copy of the database for the suspend time period.

* * * * *